US010506456B2

(12) United States Patent
Lou et al.

(10) Patent No.: US 10,506,456 B2
(45) Date of Patent: Dec. 10, 2019

(54) MULTI-BAND METHODS FOR INTERFERENCE LIMITED WIRELESS LOCAL AREA NETWORK SYSTEMS

(71) Applicant: INTERDIGITAL PATENT HOLDINGS, INC., Wilmington, DE (US)

(72) Inventors: Hanqing Lou, Syosset, NY (US); Oghenekome Oteri, San Diego, CA (US); Monisha Ghosh, Chicago, IL (US); Pengfei Xia, San Diego, CA (US); Robert L. Olesen, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/902,237

(22) PCT Filed: Jul. 2, 2014

(86) PCT No.: PCT/US2014/045250
§ 371 (c)(1),
(2) Date: Dec. 30, 2015

(87) PCT Pub. No.: WO2015/003057
PCT Pub. Date: Jan. 8, 2015

(65) Prior Publication Data
US 2016/0198350 A1 Jul. 7, 2016

Related U.S. Application Data

(60) Provisional application No. 61/842,868, filed on Jul. 3, 2013.

(51) Int. Cl.
*H04B 17/345* (2015.01)
*H04W 24/10* (2009.01)
(Continued)

(52) U.S. Cl.
CPC .......... *H04W 24/02* (2013.01); *H04B 17/345* (2015.01); *H04W 72/0453* (2013.01);
(Continued)

(58) Field of Classification Search
CPC ......... H04W 52/0206; H04W 52/0238; H04W 52/04; H04W 52/08; H04W 52/146;
(Continued)

(56) References Cited

U.S. PATENT DOCUMENTS 6,985,465 B2    1/2006  Cervello et al.
8,494,524 B2 *  7/2013  Wu ....................... H04W 16/06
                                                          455/114.2
(Continued)

FOREIGN PATENT DOCUMENTS

JP      2012080534 A    4/2012
WO      2011044667 A2   4/2011

OTHER PUBLICATIONS

Chen et al., "A Simplified Method for Beamforming Training Procedure for Multi-Band Capable MM-Wave Device," IEEE 802.11-13/0178r1 (Jan. 2013).
(Continued)

*Primary Examiner* — Brandon M Renner
*Assistant Examiner* — The Hy Nguyen
(74) *Attorney, Agent, or Firm* — Volpe and Koenig, P.C.

(57) ABSTRACT

Methods and apparatus are disclosed for communicating in a multi-band cluster. A multi-band member access point (MMAP) may be capable of communicating with a multi-band control access point (MCAP) using a first frequency band, and capable of communicating with associated stations (STAs) using a second frequency band. The MMAP may transmit data in the second frequency band to the associated STA, may transmit a request for interference information in the second frequency band to at least one
(Continued)

associated STA, may receive an interference report in the second frequency band from the at least one associated STA, may transmit information in the first frequency band to the MCAP, wherein the information is based on the interference report received from the at least one associated STA in the second frequency band, and may receive, from the MCAP in the first frequency band, information regarding radio resource management of the second frequency band.

12 Claims, 18 Drawing Sheets

(51) Int. Cl.
*H04W 24/02* (2009.01)
*H04W 72/04* (2009.01)
*H04W 72/08* (2009.01)
*H04W 84/12* (2009.01)

(52) U.S. Cl.
CPC ........ *H04W 24/10* (2013.01); *H04W 72/0426* (2013.01); *H04W 72/082* (2013.01); *H04W 84/12* (2013.01)

(58) Field of Classification Search
CPC ............. H04W 52/02; H04W 52/0229; H04W 52/0225; H04W 52/028; H04W 80/04; H04W 88/06; H04W 88/08; H04W 84/18; H04W 84/12; H04B 7/18543; H04B 7/18513; H04B 7/18515; H04B 1/1615
USPC ........ 370/328, 310, 252, 338, 329; 455/501, 455/13.4, 574, 127.5
See application file for complete search history.

(56) References Cited

U.S. PATENT DOCUMENTS

| | | | | |
|---|---|---|---|---|
| 9,319,197 | B2* | 4/2016 | Sahin | H04L 1/0025 |
| 2008/0080414 | A1* | 4/2008 | Thubert | H04W 76/022 |
| | | | | 370/328 |
| 2008/0198798 | A1* | 8/2008 | Wu | H04W 16/02 |
| | | | | 370/328 |
| 2009/0131065 | A1* | 5/2009 | Khandekar | H04W 72/082 |
| | | | | 455/452.1 |
| 2010/0027478 | A1* | 2/2010 | Chu | H04W 72/082 |
| | | | | 370/329 |
| 2011/0237243 | A1* | 9/2011 | Guvenc | H04L 5/0032 |
| | | | | 455/423 |
| 2011/0305190 | A1 | 12/2011 | Seki | |
| 2013/0003645 | A1* | 1/2013 | Shapira | H04B 7/15507 |
| | | | | 370/315 |
| 2013/0021929 | A1* | 1/2013 | Kim | H04B 7/024 |
| | | | | 370/252 |
| 2013/0114586 | A1 | 5/2013 | Kim et al. | |
| 2014/0071933 | A1* | 3/2014 | Lee | H04W 52/367 |
| | | | | 370/329 |
| 2014/0140312 | A1* | 5/2014 | Lee | H04B 7/0452 |
| | | | | 370/329 |
| 2014/0219235 | A1* | 8/2014 | Kimura | H04W 52/04 |
| | | | | 370/329 |
| 2014/0226506 | A1* | 8/2014 | Sadek | H04J 3/1694 |
| | | | | 370/252 |
| 2015/0043451 | A1* | 2/2015 | Goto | H04W 72/0453 |
| | | | | 370/329 |
| 2015/0382399 | A1* | 12/2015 | Jechoux | H04W 88/06 |
| | | | | 455/552.1 |

OTHER PUBLICATIONS

Chen et al., "MAC and PHY Proposal for 802.11af," IEEE 802.11-10/0258r1 (Mar. 2010).
Chen et al., "MAC and PHY Proposal for 802.11af," IEEE 802.11-10/0258r0 (Mar. 2010).
Chen et al., "TGaj Complete Proposal Specification (60GHz)," IEEE 802.11-13/1302r0 (Nov. 2013).
Chen, "Proposed Dynamic Channel Transfer(DCT) procedure for IEEE 802.11aj (60GHz)," IEEE 802.11-13/0440r0 (Apr. 25, 2013).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).
Halasz, "Sub 1 GHz license-exempt PAR and 5C," IEEE 802.11-10/0001r13 (Jul. 2010).
Halasz, "Sub 1 GHz license-exempt PAR and 5C," IEEE 802.11-10/0001r7 (May 2010).
Hart et al., "Enterprise extensions—overview," IEEE 802.11-11/0534r0 (Apr. 2011).
IEEE P802.11ad/D9.0, Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad/D9.0 (Jul. 2012).
IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
Park et al., "Band adjustment for fasat AP discovery," IEEE 802.11-12/1042r3 (Sep. 2012).
Shan, "[CCF works with PSM and MDA]," IEEE 802.11-06/1420r2 (Sep. 2006).
IEEE P802.11ah/D0.1, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Sub 1 GHz License Exempt Operation (May 2013).
IEEE P802.11ah™/D2.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Sub 1 GHz License Exempt Operation (Jun. 2014).
HTC Corporation, "Relay Node Access Link with different Carriers," 3GPP TSG-RAN WG1 #59, R1-094452, Jeju, Korea (Nov. 9-13, 2009).

* cited by examiner

| Multi-band Cluster ID | Multi-band Cluster Member Role | Multi-band Cluster Element | Multi-band RRM Report Control Element | Multi-band Report Element | Multi-band Capability Element |
|---|---|---|---|---|---|
| 410 | 420 | 430 | 440 | 450 | 460 |

| Element ID | Length | Multi-band Cluster ID | Multi-band Cluster Member Role | Control Band ID | Control Band Beacon Interval | Control Channel Number | Data Band ID | Data Band Beacon Interval | Data Channel Number | Data Band Bandwidth | Data Band Transmit Power Control |
|---|---|---|---|---|---|---|---|---|---|---|---|
| 505 | 510 | 515 | 520 | 525 | 530 | 535 | 540 | 545 | 550 | 555 | 560 |

| Element ID | Length | Multi-band Capabilities Info |
|---|---|---|
| 610 | 620 | 630 |

| Multi-band Cluster ID | Multi-band Cluster Member Role | Multi-band Element | Multi-band RRM Report Control Element |
|---|---|---|---|
| 710 | 720 | 730 | 740 |

| Element ID | Length | Multi-band Cluster Control Info |
|---|---|---|
| 2010 | 2020 | 2030 |

| BSSID | MAC add 1 | MAC add 1 | MAC add 1 | MAC add 1 | MAC add 2 | MAC add 2 | MAC add 2 | MAC add 2 |
|---|---|---|---|---|---|---|---|---|
| Sector ID | 0 | 1 | 2 | 3 | 0 | 1 | 2 | 3 |
| Received RSSI | | | | | | | | |

2100

MULTI-BAND METHODS FOR INTERFERENCE LIMITED WIRELESS LOCAL AREA NETWORK SYSTEMS

CROSS REFERENCE TO RELATED APPLICATION

This application is the U.S. National Stage, under 35 U.S.C. § 371, of International Application No. PCT/US2014/045250 filed Jul. 2, 2014, which claims the benefit of U.S. Provisional Application Ser. No. 61/842,868 filed Jul. 3, 2013, the contents of which are hereby incorporated by reference herein.

BACKGROUND

Multi-band operation was discussed and introduced to 802.11ad. For example, with multi-band operation, a communication session may be transferred from the 60 Gigahertz (GHz) frequency band to a lower frequency band, such as 5 GHz. A multi-band capable device may manage operation over more than one frequency band. It may support operation on multiple frequency bands simultaneously or it may support operation on one frequency band at a time, and may then transfer to another frequency band.

Institute of Electrical and Electronics Engineers (IEEE) 802.11 supports operation on different frequency channels with different channel bandwidths and supports different transmission data rates. This results in different transmission characteristics for the different 802.11 specifications. For example, 802.11ad or 802.11aj supports very high data rates (up to 6 Gigabytes per second (Gbps)) and operates on the 60 GHz frequency band. Due to the propagation loss characteristics of this frequency band, the typical coverage range may be short, such as approximately 10 meters. 802.11n/ac operates on the 2.4 GHz/5 GHz frequency bands, which support high data rates, and where the coverage may be better than that of 802.11ad. Sub-1 GHz transmission, such as in 802.11ah or 802.11af, may provide good coverage range, while the data rate may be limited. 802.11aj is a new task group working on very high throughput to support one or more of the 40-50 GHz and 59-64 GHz frequency bands. All of these wireless frequency bands provide different but complementary characteristics in terms of coverage range and throughput. This makes multi-band operation an attractive feature. However, the existing schemes supporting multi-band operations provide only basic functionality, and advancements to these schemes are needed to address future wireless local area network (WLAN) requirements for dense networks and robust high data rates.

SUMMARY

Methods and apparatus are disclosed for communicating in a multi-band cluster. A multi-band member access point (MMAP) may be capable of communicating with a multi-band control access point (MCAP) using a first frequency band, and capable of communicating with associated stations (STAs) using a second frequency band. The MMAP may transmit data in the second frequency band to the associated STA. The MMAP may transmit a request for interference information in the second frequency band to at least one associated STA. The MMAP may receive an interference report in the second frequency band from the at least one associated STA. The MMAP may transmit information in the first frequency band to the MCAP, wherein the information is based on the interference report received from the at least one associated STA in the second frequency band. The MMAP may receive, from the MCAP in the first frequency band, information regarding radio resource management of the second frequency band.

A MCAP may be configured to operate in a multi-band cluster. The MCAP may transmit a request to a MMAP for sectorization information regarding beacon transmission from other MMAPs in the multi-band cluster. The MCAP may receive a sectorization report from the MMAP. The MCAP may control sectorization transmission in the multi-band cluster based on the sectorization report, wherein a beacon transmitted by the MMAP and another MMAP are not transmitted at a same time.

BRIEF DESCRIPTION OF THE DRAWINGS

A more detailed understanding may be had from the following description, given by way of example in conjunction with the accompanying drawings wherein:

FIG. 4 shows an example of multi-band cluster information for a RRM control band;

FIG. 5 shows an example multi-band cluster element format;

FIG. 6 shows an example multi-band capabilities element format;

FIG. 7 shows an example of multi-band cluster information for a data band;

FIG. 20 shows an example multi-band cluster control element; and

FIG. 21 shows an example Neighboring OBSS Sector Interference table.

DETAILED DESCRIPTION

Figure 1A:
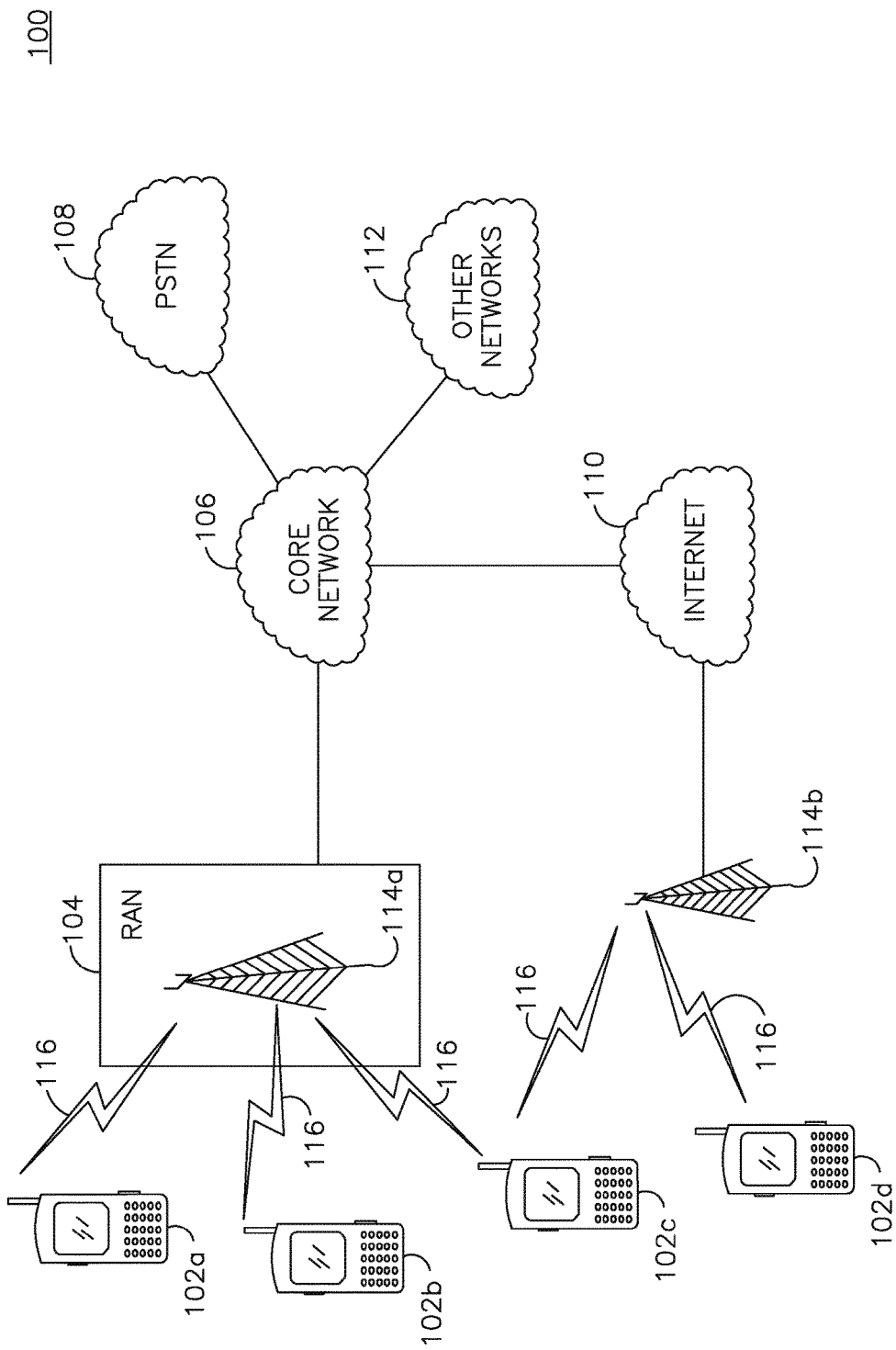
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
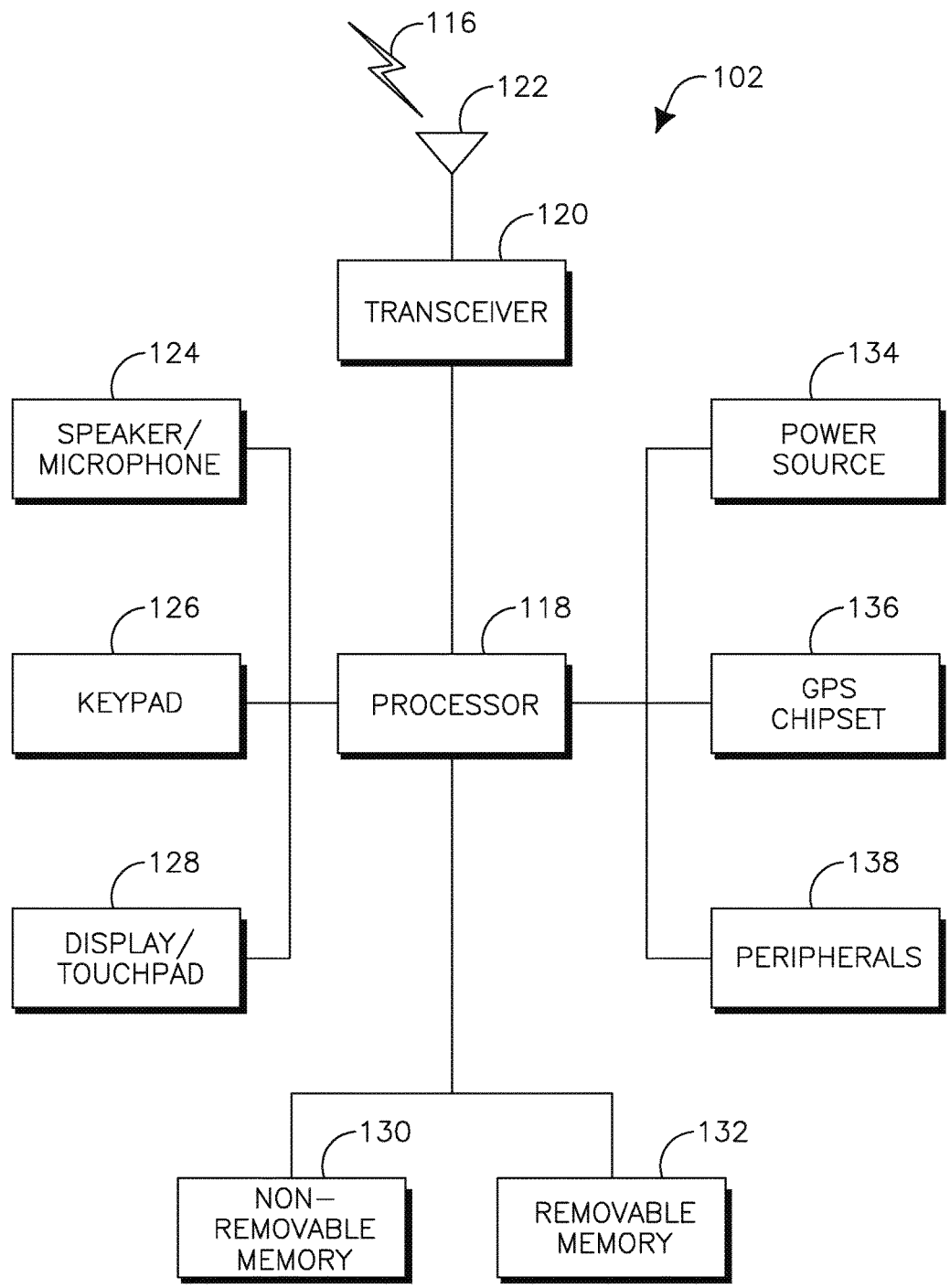
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a module that communicates via wireless radio signals such as a Bluetooth® module, a frequency modulated (FM) radio unit, a digital music player, a media player, a video game player module, an Internet browser, and the like.

Figure 1C:
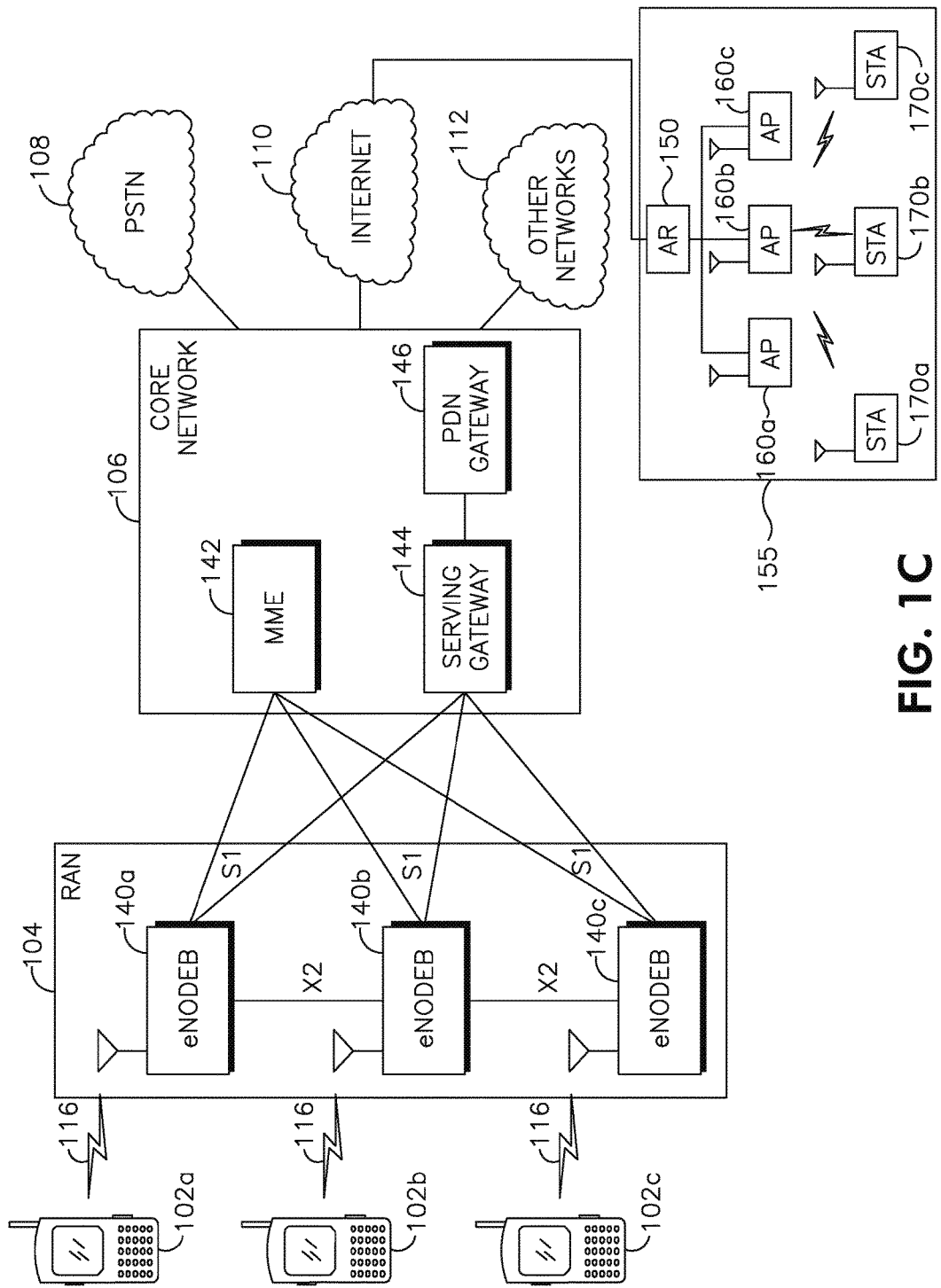
FIG. 1C is a system diagram of an example radio access network and an example core network that may be used within the communications system illustrated in FIG. 1A.

FIG. 1C shows an example RAN 104 and an example core network 106 that may be used within the communications system 100 shown in FIG. 1A. As noted above, the RAN 104 may employ E-UTRA radio technology to communicate with the WTRUs 102a, 102b, 102c over the air interface 116.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Herein, the terminology "STA" includes but is not limited to a wireless transmit/receive unit (WTRU), a user equipment (UE), a mobile station, a fixed or mobile subscriber unit, an AP, a pager, a cellular telephone, a personal digital assistant (PDA), a computer, a mobile Internet device (MID) or any other type of user device capable of operating in a wireless environment. When referred to herein, the terminology "AP" includes but is not limited to a base station, a Node-B, a site controller, or any other type of interfacing device capable of operating in a wireless environment.

A wireless local area network (WLAN) in Infrastructure Basic Service Set (BSS) mode may have an Access Point (AP) for the BSS and one or more stations (STAs) associated with the AP. The AP may have access or interface to a Distribution System (DS) or another type of wired or wireless network that carries traffic in and out of the BSS. Traffic to STAs that originate from outside the BSS may arrive through the AP and may be delivered to the STAs. Traffic originating from STAs to destinations outside the BSS may be sent to the AP to be delivered to the respective destinations. Traffic between STAs within the BSS may be sent through the AP where a source STA sends traffic to the AP and the AP delivers the traffic to a destination STA. Such traffic between STAs within a BSS is peer-to-peer traffic. Such peer-to-peer traffic may also be sent directly between the source and destination STAs with a direct link setup (DLS) using for example an 802.11e DLS or an 802.11z tunneled DLS (TDLS). A WLAN using an Independent BSS mode does not have an AP and STAs communicate directly with each other. This mode of communication is referred to as an "ad-hoc" mode of communication.

Using an 802.11 infrastructure mode of operation, an AP may transmit a beacon or beacon frame on a fixed channel, and this channel may be configured as a primary channel. This channel may be 20 Megahertz (MHz) wide, and may be the operating channel of the BSS. This channel may also be used by the STAs to establish a connection with the AP. A fundamental channel access mechanism in an 802.11 system is Carrier Sense Multiple Access with Collision Avoidance (CSMA/CA). In this mode of operation, every STA, including the AP, may sense the primary channel. If the channel is detected to be busy, the STA may back off. Hence only one STA may transmit at any given time in a given BSS.

In 802.11n, High Throughput (HT) STAs may use a 40 MHz wide channel for communication. This may be achieved by combining a primary 20 MHz channel with an adjacent 20 MHz channel to form a 40 MHz wide contiguous channel. 802.11n may operate on 2.4 Gigahertz (GHz) and 5 GHz band.

In 802.11ac, Very High Throughput (VHT) STAB may support 20 MHz, 40 MHz, 80 MHz, and 160 MHz wide channels and may operate on the 5 GHz ISM band. The 40 MHz and 80 MHz channels may be formed by combining contiguous 20 MHz channels similar to 802.11n described above. A 160 MHz channel may be formed by combining eight contiguous 20 MHz channels or by combining two non-contiguous 80 MHz channels, which may be referred to as an 80+80 configuration. For the 80+80 configuration, the data, after channel encoding, may be passed through a segment parser that divides the data into two streams. Inverse fast Fourier transform (IFFT) and time domain processing may be done on each stream separately. The streams may then be mapped onto the two channels and the data may be transmitted. At the receiver, this method may be reversed, and the combined data may be sent to the medium access control (MAC).

Sub 1 GHz modes of operation are supported by 802.11af and 802.11ah. For these specifications, the channel operating bandwidths may be reduced relative to those used in 802.11n and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. A possible use case for 802.11ah is support for Meter Type Control (MTC) devices in a macro coverage area. MTC devices may have limited capabilities including support for limited bandwidths, but also include a requirement for a very long battery life.

In 802.11ad, VHT using the 60 GHz band has been introduced. Wide bandwidth spectrum at 60 GHz is available, thus enabling VHT operation. 802.11ad supports up to 2 GHz operating bandwidths, and the data rate can reach up to 6 Gbps. The propagation loss at 60 GHz may be more significant than at the 2.4 GHz and 5 GHz bands, therefore beamforming has been adopted in 802.11ad as a means to extend the coverage range. To support the receiver requirements for this band, the 802.11ad MAC layer has been modified in several areas. One significant modification to the MAC is the addition of procedures to allow channel estimation training. These procedures include omni and beamformed modes of operation which do not exist in 802.11ac or earlier associated specifications such as 802.11n and 802.11a.

WLAN systems which support multiple channels and channel widths, such as 802.11n, 802.11ac, 802.11af, and 802.11ah, may include a channel which is designated as the primary channel. The primary channel may, but not necessarily, have a bandwidth equal to the largest common operating bandwidth supported by all STAs in the BSS. The bandwidth of the primary channel may therefore be limited by the STA, out of all STAs operating in a BSS, which supports the smallest bandwidth operating mode. In an example of 802.11ah, the primary channel may be 1 MHz wide if there are STAs (e.g. MTC type devices) that only support a 1 MHz mode even if the AP and other STAs in the BSS support a 2 MHz, 4 MHz, 8 MHz, 16 MHz, or other channel bandwidth operating mode. Carrier sensing and network allocation vector (NAV) settings may depend on the status of the primary channel. Therefore, if the primary channel is busy, for example, due to a STA supporting only a 1 MHz operating mode that is transmitting to the AP, then the entire available frequency band may be considered busy even though majority of it stays idle and available.

In the United States, the available frequency band which may be used by 802.11ah is from 902 MHz to 928 MHz. In Korea it is from 917.5 MHz to 923.5 MHz, and in Japan, it is from 916.5 MHz to 927.5 MHz. The total bandwidth available for 802.11ah is 6 MHz to 26 MHz depending on the country code.

A multi-band RRM network may include multi-band clusters. A multi-band cluster may be defined as a set of devices which may operate on multiple frequency bands. A multi-band cluster may manage a multi-band RRM control network and a multi-band data network.

The multi-band RRM control network may be made up of one or more Multi-band Control AP (MCAP) device and Multi-band Member AP (MMAP) device. A MCAP may serve as a controller for a cluster of APs controlled in the RRM network. A MMAP may modify its use of the radio resources available based on signaling from the MCAP. Non-AP STAs may be allowed to associate with the MCAP and operate on the control channels. In this case, communication between the MCAP and non-AP STAs on the control channel may follow normal 802.11 specifications. A multi-band data network may be a network for data transmission. Necessary control frames and management frames may also be transmitted over the data network.

Figure 2:
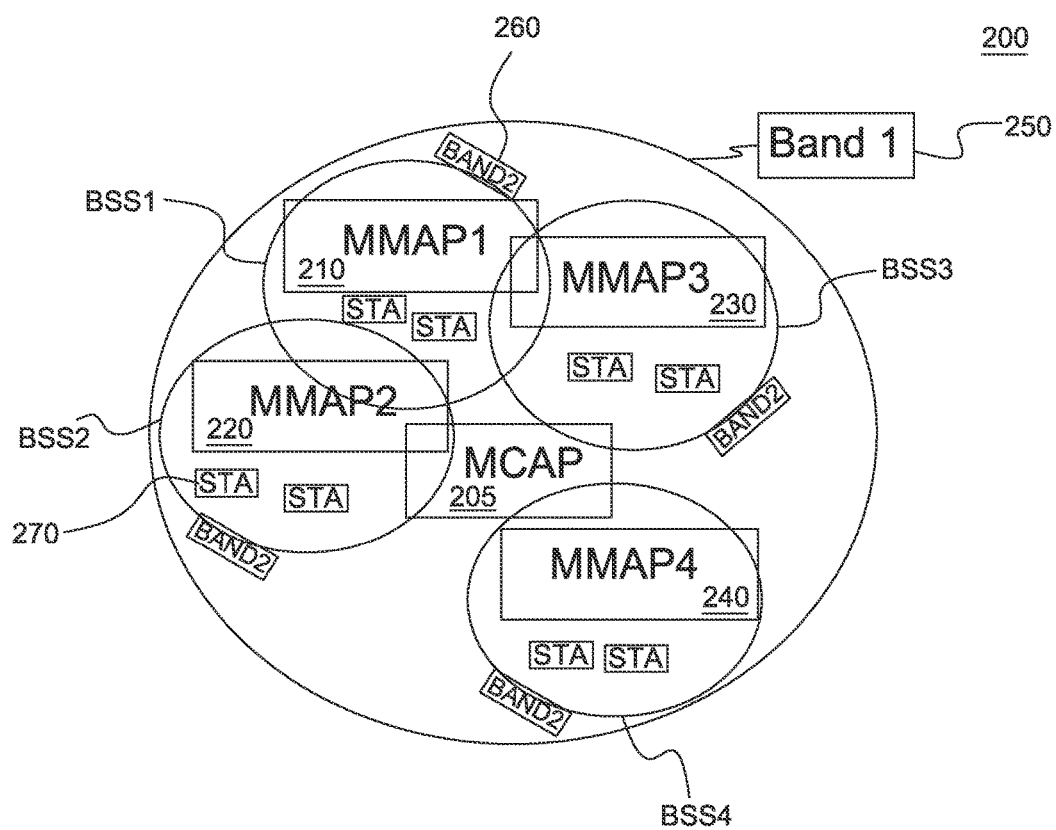
FIG. 2 shows an example multi-band radio resource management (RRM) cluster.

A multi-band RRM cluster may comprise a MCAP, several MMAPs, and several non-AP STAs. FIG. 2 shows an example multi-band RRM cluster 200. The MCAP (205) may communicate with a MMAP, such as MMAP1 (210) on a control band or band 1 (250) (e.g., the 2.4 GHz band). The MMAPs (210, 220, 230, 240) may maintain a BSS and communicate with associated STAs (270), for example on the data band or band 2 (260) (e.g., the 5 GHz band). The MCAP may also maintain a BSS over an RRM control band with associated non-AP STAs (i.e., the device may be a non-dedicated MCAP). In this way, the control band may also carry data traffic. In FIG. 2 one MCAP, four MMAPs, and two STAs in each BSS are shown, however, this is an example and any number and combination of MCAP, MMAP, and STA may be formed.

Figure 3:
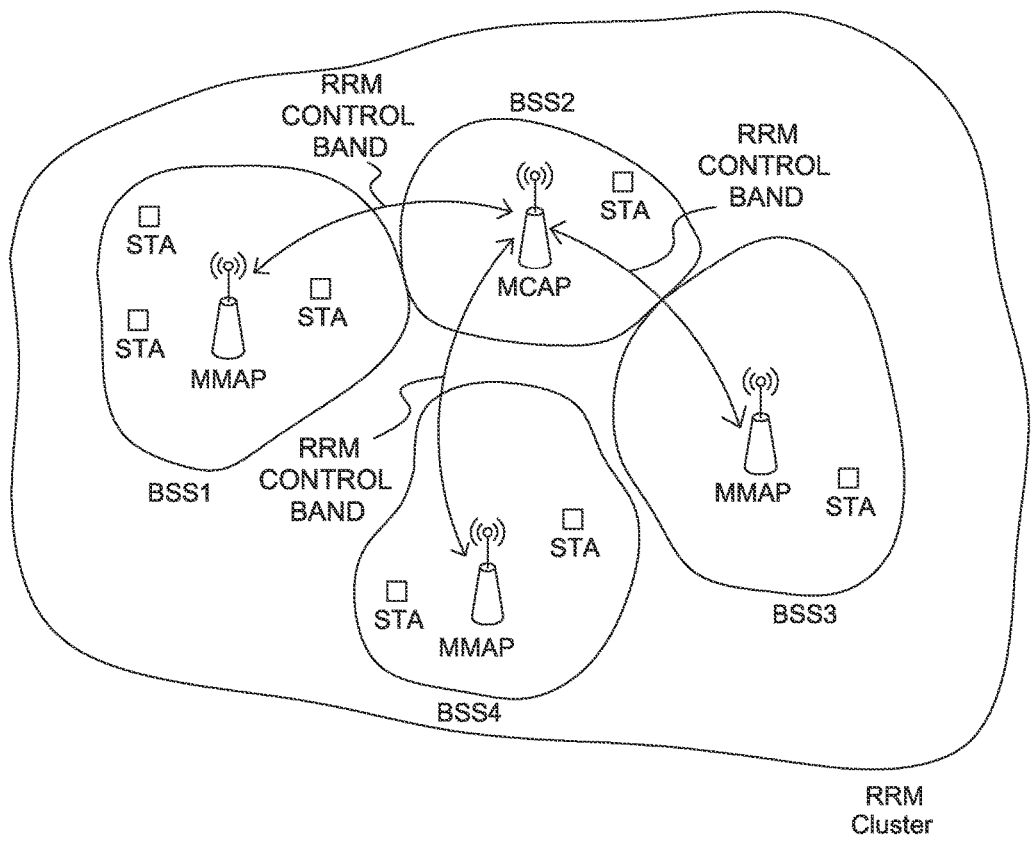
FIG. 3 shows an example multi-band RRM cluster.

FIG. 3, shows an example multi-band RRM cluster. The MCAP may transmit multi-band RRM control messages to the MMAPs over the RRM control band. The MMAPs may transmit a request to the MCAP through the RRM control band. On the RRM control band, the MCAP may operate as an AP, and MMAPs may operate as STAs when the MMAPs want to associate with the MCAP.

Communication between MCAP/MMAPs and non-AP STAs may be on a data band. The MMAPs within the multi-band cluster may operate on the same frequency channel or they may operate on different frequency channels of the frequency band. For example, BSS1 to BSS4 in FIG. 3 may operate on the 5 GHz frequency band for the data band, and operate on the 2.4 GHz band for the RRM control band. BSS1 to BSS4 may operate on the same frequency channel of the 5 GHz band or different frequency channels on the 5 GHz band.

The coordination of the multi-band cluster may be through a RRM control band. A beacon or beacon frame may be transmitted by a MCAP over an RRM control band which may contain multi-band cluster information. The multi-band cluster information may contain a Multi-band Cluster identification (ID), a Multi-band Cluster Member Role, a Multi-band Cluster element, a Multi-band RRM Report Control element, a Multi-band Report element, and a Multi-band Cap ability element.

FIG. 4 shows an example of multi-band cluster information for an RRM control band. The multi-band cluster information may include a Multi-band Cluster ID (410), a Multi-band Cluster Member Role (420), a Multi-band Cluster element (430), a Multi-band RRM Report Control element (440), a Multi-band Report element (450), and a Multi-band Capability element (460).

The Multi-band Cluster ID may be identical to the MAC address of the MCAP. If an MMAP does not transmit a beacon on the RRM control band, the MMAP may include the Multi-band Cluster ID in an association/re-association frame, such that both the MMAP and the MCAP know that they belong to the same multi-band cluster.

The Multi-band Cluster Member Role field may be used to distinguish the MCAP and MMAP. If an MMAP does not transmit a beacon on the RRM control band, the MMAP may include the Multi-band Cluster Member Role field in an association/re-association frame, such that both the MMAP and the MCAP know the role of each other.

The Multi-band Cluster element field may define the RRM data band and usage of frequency channels on the RRM data band, in addition to other elements. For a defined RRM data band, some or all of the data channels which may be utilized in this data band may also be indicated. If channel aggregation is considered in the data band, the primary channel may be defined. The Multi-band Cluster Element may also define the RRM control band and the operation channels on the RRM control band. The MCAP or MMAP may also transmit the Multi-band Cluster Element in an association/de-association frame.

FIG. 5 shows an example Multi-band Cluster element format 500. The Multi-band Cluster element may include an Element ID field (505). The Multi-band Cluster element may include a length field (510). The length field may specify a number of octets for the information elements. The Multi-band Cluster element may include a Multi-band Cluster ID field (515) which may be the MAC address of the MCAP. The Multi-band Cluster element may include a Multi-band Cluster Member Role field (520) which is an MCAP, MMAP, or non-AP STA which is associated with the MCAP and is operating on the control band. The Multi-band Cluster element may include a Control Band ID field (525) which identifies the control band. The Multi-band Cluster element may include a Control Band Beacon Interval field (530) which identifies a size of the beacon interval of the control band. The Multi-band Cluster element may include a Control Channel Number field (535) which identifies the number of the channel on the control band that the STA which transmits the multi-band cluster element operates or intends to operate on. The Multi-band Cluster element may include a Data Band ID field (540) which identifies the data band. The Multi-band Cluster element may include a Data Band Beacon Interval field (545) which identifies the size of the beacon interval of the data band. The Multi-band Cluster element may include a Data Channel Number field (550) which identifies the number of the channel on the control band that the STA which transmits the multi-band cluster element operates on or intends to operate on. The Multi-band Cluster element may include a Data Band Bandwidth field (555) which identifies the bandwidth supported for the data band. The Multi-band Cluster element may include a Data Band Transmit Power Control field (560) which identifies the transmit power control method supported on the data band.

RRM information may be transmitted over the RRM control band, and thus RRM related measurements from an MMAP to the MCAP may be required. A Multi-band RRM Report Control element may be used in the beacon by the MCAP to request a RRM report from the MMAP. The Multi-band RRM Report Control element may request an interference report, energy report, load balance report, etc. The Multi-band RRM Report Control element may assign periodic RRM report slots which may be utilized by MMAPs to send RRM reports periodically. The element may also assign a threshold for RRM reports, and MMAPs may send updated reports on a condition that the measurements exceeded a threshold. The threshold may also be used to limit the periodicity of the reports. The Multi-band RRM Report Control element may contain basic multi-band information, such as Multi-band Cluster ID, Data band ID, Data band channel ID and bandwidth, and the like.

The Multi-band RRM Report element may be used by MMAPs to send RRM related measurements to the MCAP. The Multi-band RRM Report element may be used to reply to the Multi-band Report Control element transmitted by the MCAP. Alternatively, the MMAP may send the Multi-band RRM Report element without a request from the MCAP. The Multi-band RRM Report element may contain basic multi-band information, such as Multi-band Cluster ID, Data band ID, data band channel ID and bandwidth and the like. The Multi-band RRM Report element may include an interference report, an energy report, a load balance report, and the like.

The Multi-band Capability element may include multi-band related transmission capabilities which may be required by the MMAPs and MCAP. The Multi-band Capability element may be sent when the MMAP joins the multi-band cluster. The MCAP may broadcast the Multi-band Capability element in a beacon overt the control band.

FIG. 6 shows an example Multi-band Capabilities Element format 600. The Multi-band Capabilities Element may include an Element ID field (610). The Multi-band Capabilities Element may include a length field (620). The Multi-band Capabilities Element may include a Multi-band Capabilities Info field (630). The Multi-band Capabilities Info field may include multi-band aided dynamic frequency channel assignment support information. The Multi-band Capabilities Info field may include multi-band aided network energy and interference management support information. The Multi-band Capabilities Information field may include sectorized/directional transmission support information. The Multi-band Capabilities Information field may include multi-band coordinated sectorized transmission support information.

FIG. 7 shows an example of multi-band cluster information for a data band 700. A beacon may be transmitted over an RRM data band and may contain, in addition to normal information defined in a beacon frame, a Multi-band Cluster ID (710), a Multi-band Cluster Member Role (720), Multi-band element (730), and Multi-band RRM Report Control element (740).

An AP, including both an MCAP and a MMAP, may transmit a beacon over the data band which may include a Multi-band Cluster ID field. A Multi-band Cluster ID field may be used to identify the multi-band cluster. The ID may be the MAC address of the MCAP. The Multi-band Cluster ID field may also be transmitted by an association/re-association frame.

An AP, including both an MCAP and a MMAP, may transmit a beacon over the data band which may include a Multi-band Cluster Member Role field. A Multi-band Cluster Member Role field may be used in a beacon frame to distinguish the MCAP and the MMAPs. This field may also be transmitted by an association/re-association frame.

An AP, including both an MCAP and a MMAP, may transmit a beacon over the data band which may include a Multi-band Element field. The Multi-band Element field may be used in a beacon frame to define the RRM data band, the usage of frequency channels on the RRM data band, in addition to other elements. The Multi-band Element may also define the RRM control band, and the operating frequency channel utilized on the RRM control band. The Multi-band Element may also be transmitted by an association/re-association frame.

An AP, including both an MCAP and a MMAP, may transmit a beacon over the data band which may include RRM Report Control element. An RRM Report Control element may be used to request RRM related reports from STAs. The request may be for an interference report, energy report, and the like. The MMAPs may send an RRM Report Control element to the STAs over the data band. The RRM Report Control Element may assign a time slot periodically for RRM reports. This element may set a parameters/threshold for the STAs to limit the periodicity of the reports in the case of periodic reports or to report in the case in which a threshold is exceeded.

Figure 8:
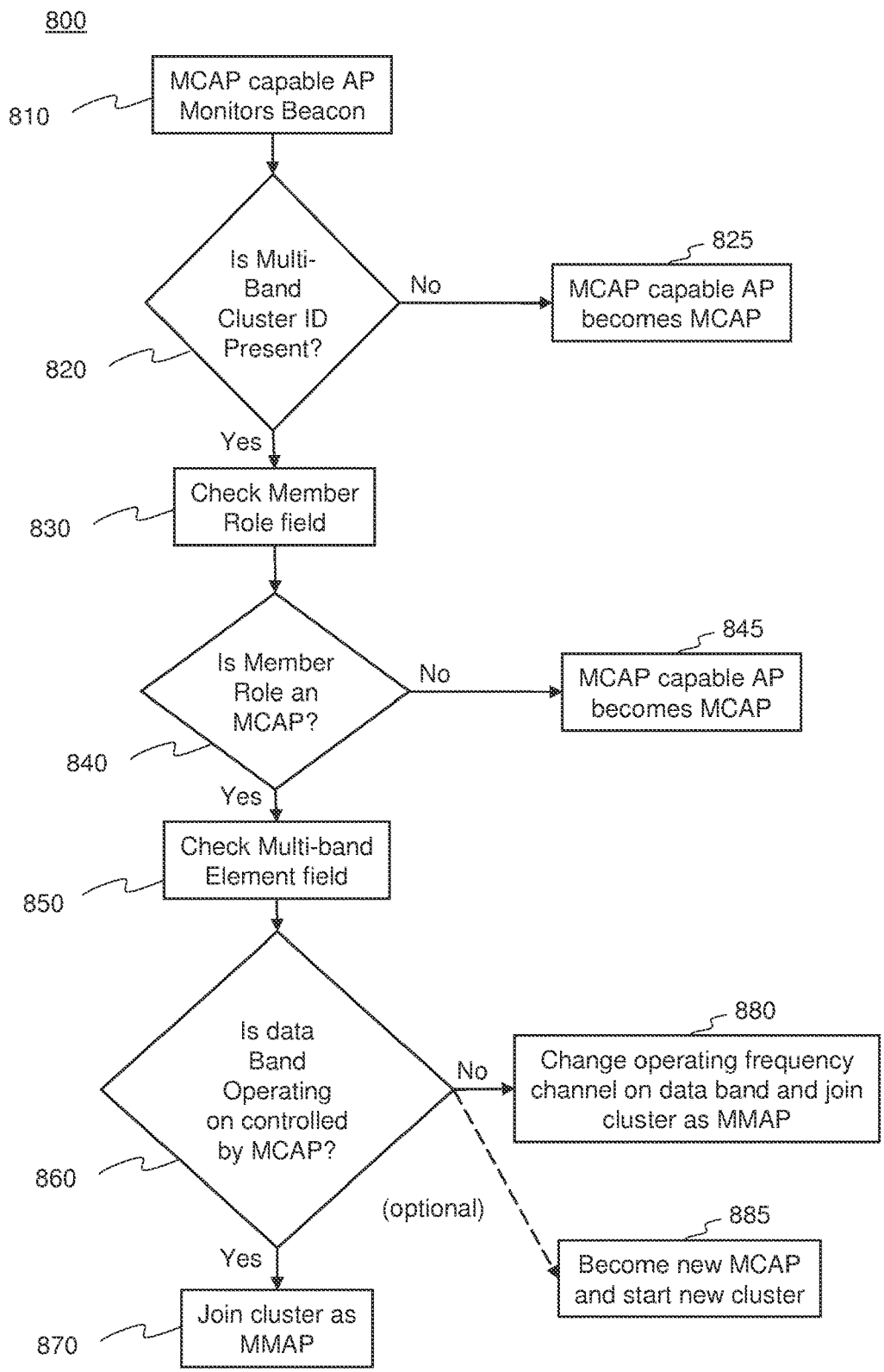
FIG. 8 shows an example method for multi-band cluster formation.

An MCAP capable device may become a MCAP and form a multi-band cluster. The MCAP capable device may start a BSS as an AP on the RRM data band, and then determine whether it is possible to become a MCAP for the multi-band cluster. FIG. 8 shows an example of a multi-band cluster formation 800. Before a MCAP capable device becomes a MCAP, it may monitor the beacon on the RRM control band over a pre-defined period (810). The MCAP capable device may check some or all of the beacons received during this period to detect whether a Multi-band Cluster ID is present in any beacon (820). On a condition that no Multi-band Cluster ID is present in a beacon over the period, the MCAP capable device may become a MCAP (825). On a condition that a Multi-band Cluster ID is present in a beacon, the MCAP capable device may check the Multi-band Cluster Member Role field to determine whether an MCAP is detected (830, 840). On a condition that no MCAP is detected over the period, the MCAP capable device may become a MCAP (845). If a Multi-band Cluster ID is detected and the Multi-band Cluster Member Role field indicates the presence of a MCAP, the MCAP capable device may check the Multi-band Element field in the beacon (850) to determine whether the data band that the MCAP capable device is operating on is indicated in the Multi-band Element field as one of the data bands that the MCAP controls (860). On a condition that the data band that the MCAP capable device is operating on is indicated in the Multi-band Element field as one of the data bands that the MCAP controls, the MCAP capable device may join the multi-band cluster as a MMAP (870). On a condition that the data band that the MCAP capable device is operating on is not indicated in the Multi-band Element field as one of the data bands that the MCAP controls, the MCAP capable device may change the operating frequency channel on the data band following the MCAP, and join the multi-band cluster (880). Alternatively, the MCAP capable device may become a new MCAP and start a new multi-band cluster (885). Alternatively, the MCAP capable device may ask the existing MCAP to add a new frequency channel on the data band in the multi-band cluster.

If a MCAP is lost, or it appears it may be lost for one or more MMAPs over the RRM control band, an MMAP may become a new MCAP.

The MMAPs that lost connection with the MCAP may monitor the RRM control band for a predefined time period and if no MCAP is detected, one of the MMAPs may become a MCAP and start a new multi-band cluster. In the case that many MMAPs lost connection with the MCAP, and if only one MCAP is elected, the election rule may be defined. For example, the MMAP with the maximum or minimum MAC address among all of the MMAPs who lost connection may become the new MCAP.

After becoming a new MCAP, the new MCAP may transmit a multi-band beacon on the RRM control band, and the rest of the MMAPs may perform association with the new MCAP. The transmission on the data band may not be interrupted.

The multi-band aided RRM may be implemented in a distributed manner rather than a centralized manner. For example, the MCAP and MMAP devices may be identical, with each MMAP holding an MCAP token for a period that it needs to dynamically adjust its channel using MCAP start/MCAP end frames. Alternatively, the MCAP period may be mandated for a desired period using the MCAP start frame.

In a densely deployed system, an AP may have one or more overlapping BSSs (OBSSs). Due to changes in the environment (e.g., mobility of APs, etc.), an AP may dynamically choose its frequency channel. Each AP may monitor the frequency channel bands and decide which band is best to operate in using criteria that may be related to the measured interference or other measurements which provide an indication of the interference. However, once the AP moves to that frequency band, it may introduce interference to a new set of OBSS APs, and a single AP may not be able to pick a frequency channel which is desirable for the operation of the entire network system.

For dynamic frequency channel assignment, an MCAP may need to know the interference profile of the BSSs controlled by the MMAPs under its management. The STAs in the BSS controlled by each MMAP may measure the interference experienced due to interfering MMAPs and may identify the primary interfering MMAPs. It may be possible to report the interference from other APs which may not be in the current MCAP cluster. The MCAP may use this information to incorporate this AP (i.e. the interfering AP not in the current MCAP cluster) into the MCAP cluster if its interference effect is significant enough. The measured interference may be transmitted by the STAs to the MMAP on the data transmission band, since the STAs may not be multi-band. If the STAs are multi-band, they may transmit this information on the RRM control network band.

A new RRM control network Interference Request/Report frame may be used to request, measure, and report the interference seen by each STA from interfering MMAPs in the RRM control network. New fields may be added to the interference request/report frames as defined in IEEE 802.11-2012.

Figure 9:
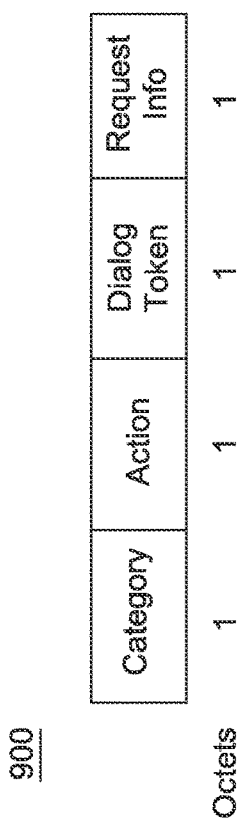
FIG. 9 shows an example Action frame body format.
Figure 10:
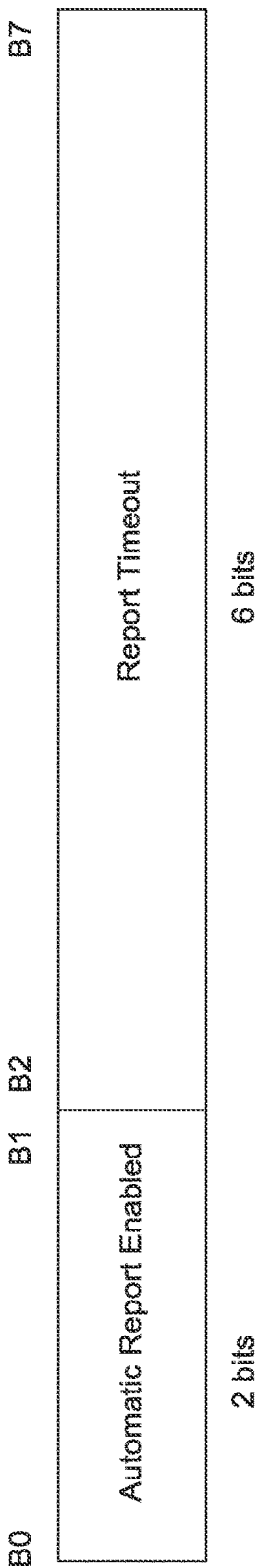
FIG. 10 shows an example request information field format.

The RRM Interference Request/Report frame may use an Action frame body format and may be transmitted by an MMAP to request interference reports, which may be sent using an RRM Interference Report frame. An example format of the RRM Interference Request frame body is shown in FIG. 9. FIG. 10 shows an example request information field format 1000. An automatic report enabled field may indicate whether the report is sent on a condition that there is a change or periodically. A report timeout field may indicate a minimum duration between reports. The request information field 1000 may be eight bits long. The automatic report enabled field may be two bits and the report timeout field may be 6 bits.

Figures 11, 12:
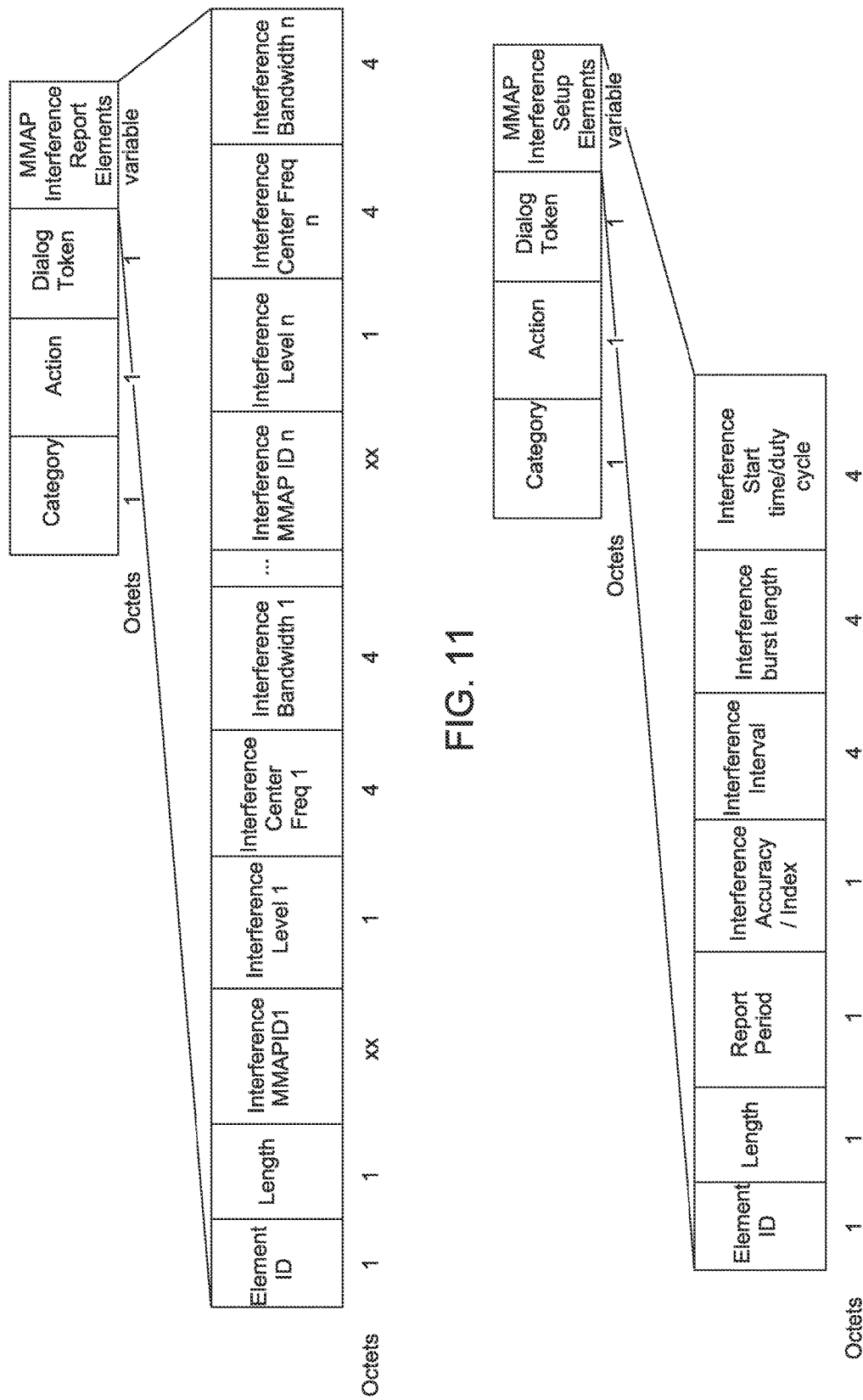
FIG. 11 shows an example RRM Interference Report frame.
FIG. 12 shows an example MMAP interference elements setup frame.

An RRM Interference Report frame may be transmitted in response to an Interference Request frame and may use an Action frame body format. The report frame may be used to indicate the interference level for each of the interfering MMAPs detected, and may signal the ID, the interference level, the center frequency, and the bandwidth of the interfering AP, as shown in FIG. 11. An MMAP Interference Report Setup frame may be used to set up the parameters of the report, such as a report period, accuracy, interval, burst length, and start time/duty cycle as shown in FIG. 12.

Figure 13:
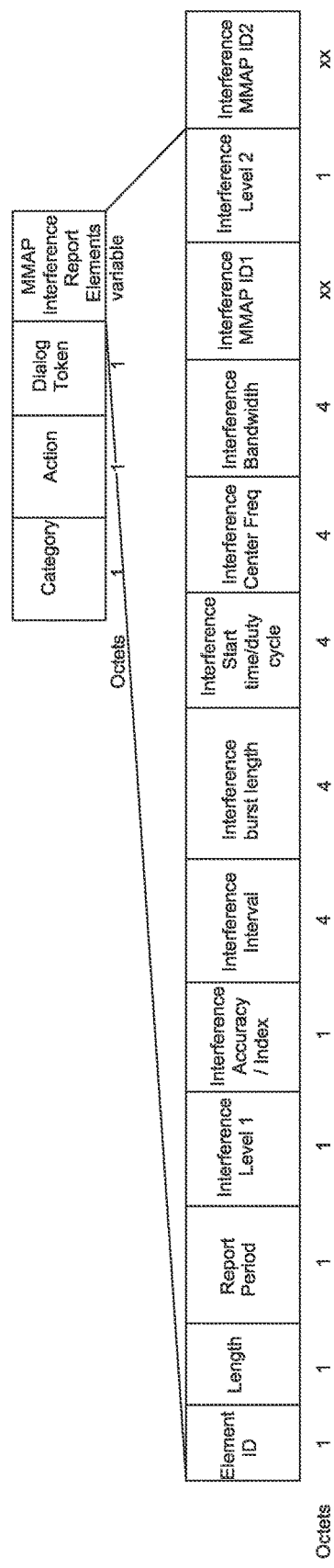
FIG. 13 shows an example MMAP interference report elements frame.

Alternatively, the RRM Interference Report frame may contain new fields signaling the interfering MMAPs' IDs and their corresponding interference levels, as shown in FIG. 13, in addition to existing fields in the interference report frame as defined in IEEE 802.11-2012.

A STA may report the measured interference from to a MMAP by reusing the interference reporting mechanism in IEEE 802.11ad. A STA that receives a request to send (RTS) and/or directional multi-gigabit (DMG) clear to send (CTS) frame that updates the NAV and that overlaps in time with a Service Period where the STA is destination or source, may report the overlap to the personal basic service set (PBSS) control point (PCP)/AP.

A STA may report the measured interference from to a MMAP by reusing the co-located interference request/report frames in IEEE 802.11. The co-located request/report frames may send information regarding interference of a second transceiver co-located with the transceiver that sends the request/response. In this case, the MCAP may send a co-located interference request frame to an MMAP on the RRM control band, requesting for information on the "co-located" MMAP on the RRM data band. The MMAP may reply with a co-located interference report frame. The report frame may be extended to add interference information from the STAs associated with the AP as shown in FIGS. 11-13.

The MMAP may send one or more parameters or thresholds to the STAs to control the periodicity of the reports in the case of periodic reports or to report only when certain thresholds are met or exceeded. The thresholds may be set up during multi-band cluster formation.

Once the MMAPs have received, from STAs, interference reports and information regarding identification of primary interfering MMAPs, the MMAPs may aggregate the information from the STAs in their BSS/PBSS and transfer the information to the MCAP on the RRM control band. The transfer from MMAP to MCAP may be initiated by the MCAP. For example, the MCAP may poll the MMAPs individually for interference reports. The MCAPs may poll the MMAPs for all the information they have or for information on a specific STA. This may be initiated by a new polling frame. Alternatively, the MMAPs may send unsolicited interference reports to the MCAP, for example, when there is a change in the status of a STA under its control.

An MMAP may transfer interference information to the MCAP by aggregating the information from all the STAs under its control and sending the aggregated data in a frame with information specifying the MMAP that it is coming from and the corresponding STA indices. The MCAP may analyze the information from all of the STAs/MMAPs and based on this may send out signals to execute the RRM management.

Alternatively, an MMAP may transfer information for specific STAs. The MMAP may forward only the information that the MCAP may need for RRM. For example, the MMAP may forward information on STAs with parameters that fall within some range.

Alternatively, the MMAP may analyze the interference information from the STAs and forward derivative information such as the indices of any significant interfering MMAPs and suggestions on actions to take to alleviate the interference. For example, the MMAP may maintain a neighbor MMAP list, and based on the report from STAs, it may create a neighbor MMAP interference table. An interference level value may be calculated for each entry in the neighbor MMAP list. The value may increase once a STA reports interference from the MMAP. The value may decrease if no STA reports any interference from the MMAP for a certain period. In this example, the quantized neighbor MMAP interference table may be reported to the MCAP.

Once the MMAP has transferred the interference information, the MCAP may explore the availability of the frequency channels within a frequency band for a transfer by requesting a neighboring band report from one or more MMAPs. The MMAPs may monitor neighboring band interference levels. Alternatively, the MMAP may monitor neighboring APs and their reported bands of transmission. The MMAP may forward this information to the MCAP.

The MCAP may analyze the information and may decide that one of the MMAPs should transition to a different channel. The MCAP may then send a transfer channel signal. The transfer channel frame may include a transfer channel flag, an MMAP identifier, an old channel index, and a new channel index. The channel index used may be based on the IEEE 802.11 standard. The MMAP may then broadcast a signal to all STAs to dis-associate and re-associate to the desired new channel. A new 802.11 handover frame may be used to indicate the preferred AP. This frame may include a frame identifier to indicate the channel move, the index of the new STA, and a grace time after which the move will be completed.

Figure 14:
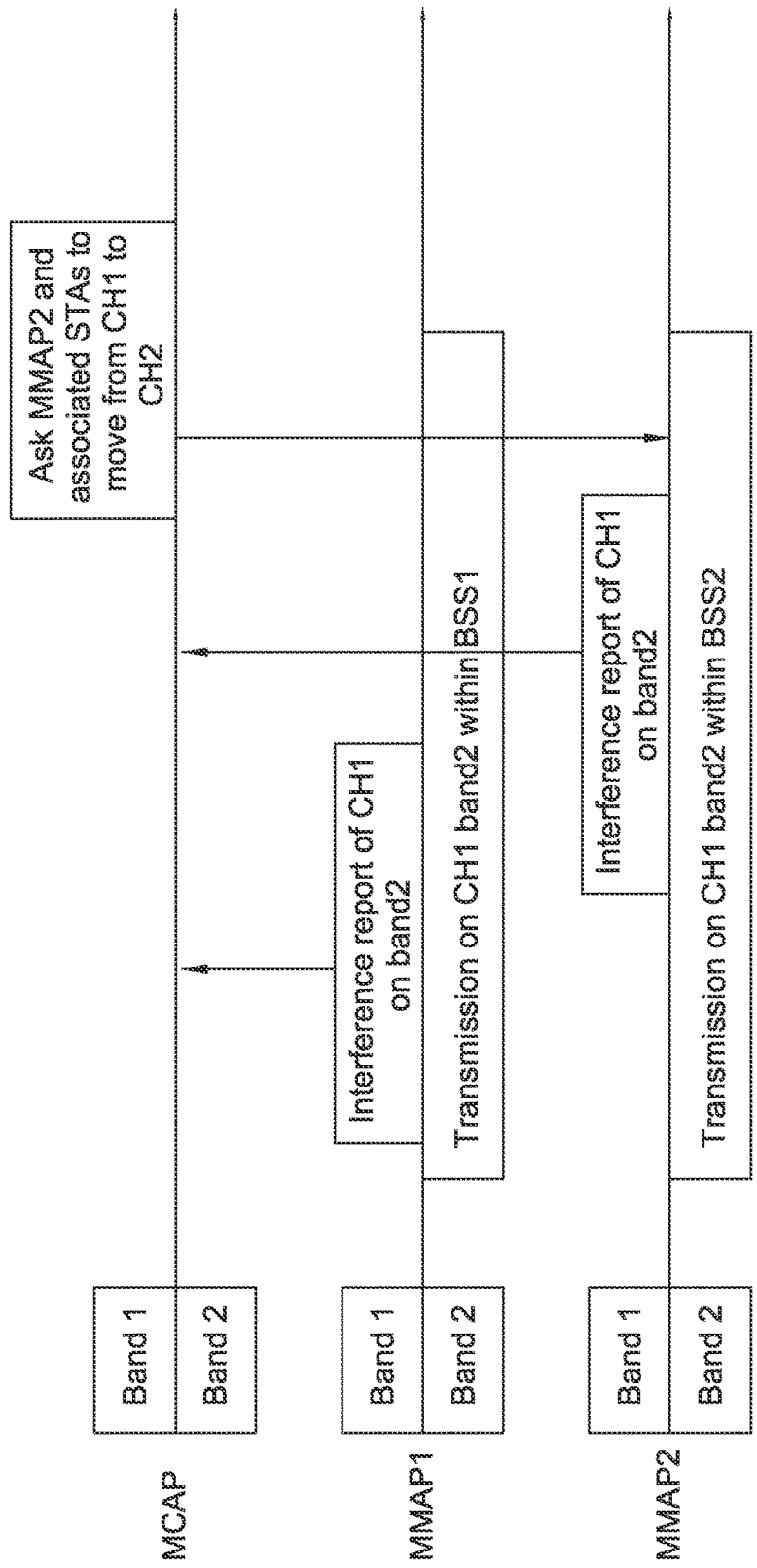
FIG. 14 shows an example multi-band aided RRM for dynamic channel assignment.

As shown in FIG. 14, MMAP1 sends an interference report of channel 1 on band 2 to the MCAP. MMAP2 sends an interference report of channel 1 on band 2 to the MCAP. The MCAP sends a transfer channel signal asking MMAP2 and the STAs associated with MMAP2 to move from channel 1 to channel 2.

Figure 15:
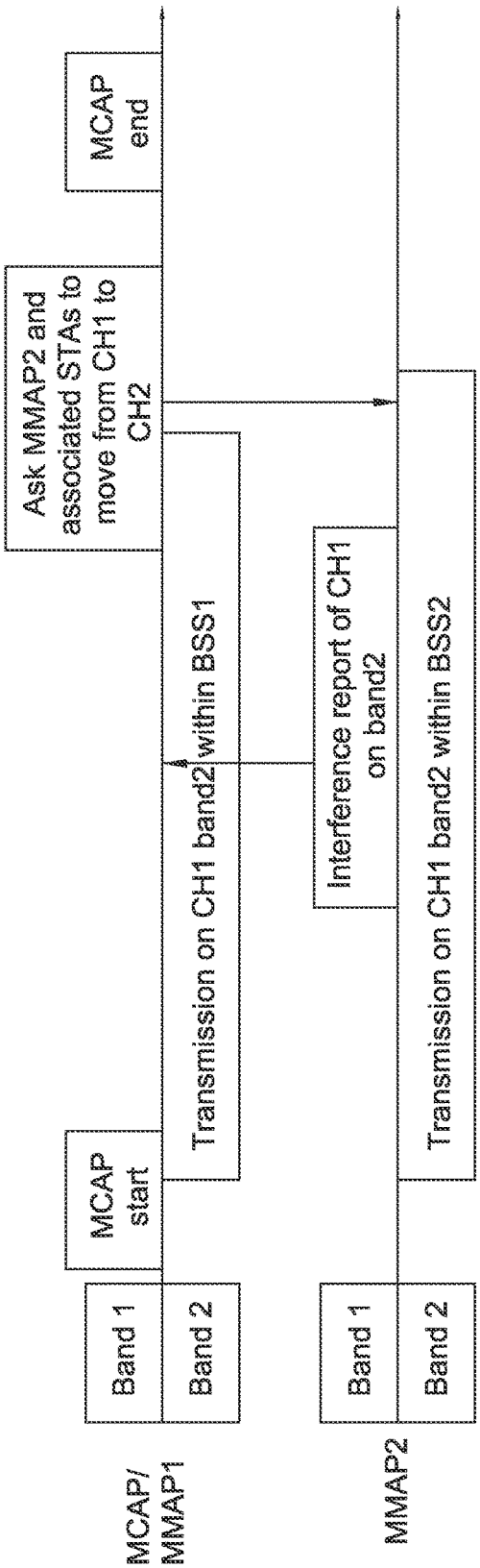
FIG. 15 shows an example distributed multi-band aided RRM for dynamic channel assignment.

Alternatively, the multi-band aided RRM may be implemented in a distributed manner rather than a centralized manner. For example, the MCAP and MMAP devices may be identical, with each MMAP holding an MCAP token for the period that it needs to dynamically adjust its channel using a MCAP start/MCAP end frames, as shown in FIG. 15. Alternatively, the MCAP period may be mandated for a desired period using the MCAP start frame.

In a densely deployed system, co-channel interference and the associated energy inefficiency due to interfering transmissions from neighboring STAs/APs may be present. If all the devices transmit using a maximum or nominal transmit power, which is common in current WLAN settings, each device may produce interference to the STAs/APs within its coverage range.

The network may improve the energy efficiency of the network and reduce the amount of inter-BSS interference by dynamically adjusting the transmit power of different BSSs in the network using multi-band signaling. The MCAP may request that an entire BSS reduce its nominal transmit power to reduce the effect of interference to neighboring BSSs. In this case, the MCAP may send and receive control information via the RRM control band. For example, if both MMAP1 and MMAP2 are operating on the same data band, the MCAP may ask one or both MMAPs to reduce their nominal transmit power contingent on the power needed to close the link with the farthest STA in the BSS.

The MCAP may need to know the transmit power, path loss, and transmit power margins to/from some or all of the STAs of the BSSs controlled by the MMAPs under its management.

The MMAPs may send a transmission power command (TPC) request to some or all of the STAs in its BSS. Each STA may reply with a TPC report that contains the transmit power used by the STA and the link margin. The MMAP that sends the TPC request may have a choice of the STAs that it sends the TPC request to. To reduce overhead, the MMAP may send TPC request to STAs that are located far away.

The MMAPs and associated STAs may use the RRM interference request/response procedure to measure and obtain interference information.

The MMAPs may aggregate the information from the STAs in their BSS/PBSS and transfer the information to the MCAP on the RRM control band. The transfer from MMAP to MCAP may be initiated by the MCAP. The MCAP may poll the MMAPs individually for reports. The MCAPs may poll the MMAPs for all the information they have or for information on a specific STA. Alternatively, the MMAPs may send unsolicited reports to the MCAP, for example, in the case where there is a large change in the status of a STA under its control.

The MMAP may transfer the data by aggregating the information from all of the STAs under its control and send the aggregated data in a frame with information specifying the MMAP that it is coming from and the corresponding STA index. The MCAP may analyze the information from all of the STAs/MMAPs and based on this send out signals to execute RRM management action.

The MMAP may transfer the data by forwarding only the information that the MCAP may need for RRM. For example, the MMAP may forward information on STAs with parameters that fall within some range.

The MMAP may transfer the data by analyzing the interference information from the STAs and forward derivative information. Examples of such derivative information may include the indices of any significant interfering MMAPs and suggestions on actions to take to alleviate the interference such as reducing interfering MMAP transmit power.

Figure 16:
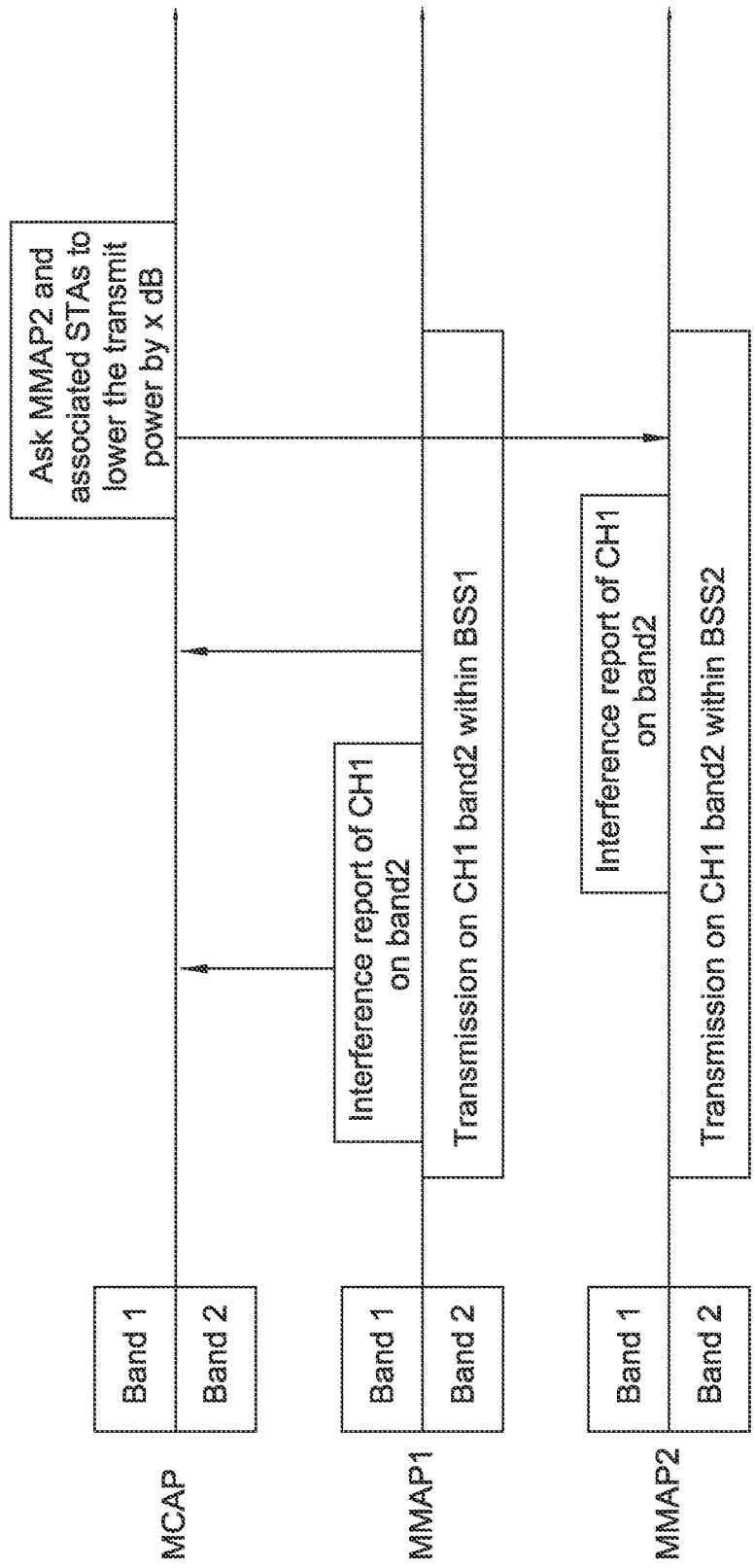
FIG. 16 shows an example multi-band aided RRM for network energy and interference management.

After data has been transferred, the MCAP may analyze the received information and may decide on a transmit power change for one or more MMAPs and associated STAs in its RRM control network. Alternatively, it may decide on a transmit power change for specific STAs associated with an MMAP. The MCAP may send a TPC change signal to specific MMAPs. The MMAPs may then send a signal to some or all of its STAs to change the transmit power by a desired amount. The MCAP change frame may include a frame identifier to indicate the BSS power change, the MMAP index, and the desired power change. The MMAP change frame may include a frame identifier to indicate the BSS power change and the desired power change. The frame may be aggregated in the beacon or the beacon may be modified with two additional fields containing this information. As shown in FIG. 16, MMAP1 sends an interference report of channel 1 on band 2 to the MCAP. MMAP2 sends an interference report of channel 1 on band 2 to the MCAP. The MCAP sends a signal to MMAP2 asking MMAP2 and its associated STAs to lower the transmit power by a specified amount.

Figure 17:
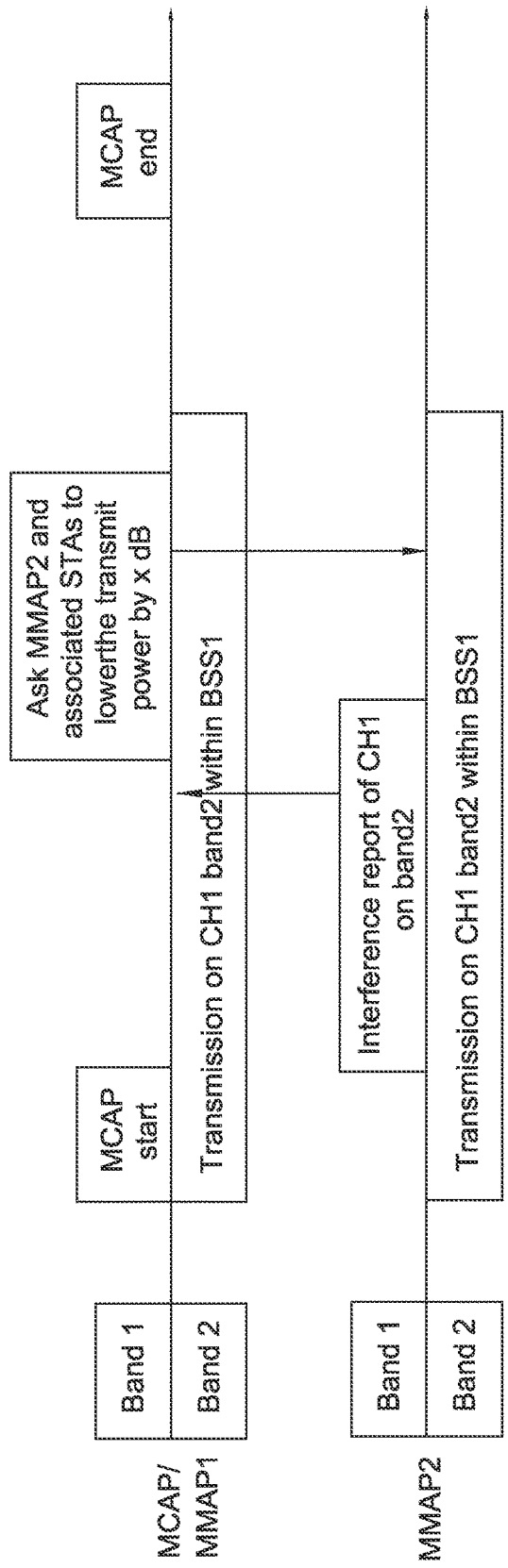
FIG. 17 shows an example distributed multi-band aided RRM for network energy and interference management.

Alternatively, the multi-band aided RRM may be implemented in a distributed manner rather than a centralized manner. For example, the MCAP and MMAP devices may be identical, with each MMAP holding an MCAP token for the period that it needs to dynamically adjust its channel using a MCAP start/MCAP end frames, as shown in FIG. 17. Alternatively, the MCAP period may be mandated for a desired period using the MCAP start frame.

Some 802.11 specifications support directional or sectorized transmission, and in some specifications such as 802.11ad and 802.11aj, directional transmission may be mandatory. 802.11ah also considers sectorized transmission in the specifications. With densely deployed systems, the directional/sectorized transmission from co-channel APs may be coordinated and designed such that the interference from directional/sectorized transmission may be mitigated. For example, a multi-band system may manage and coordinate directional/sectorized transmission on one band, and may perform transmissions on another band.

Sectorized transmission may include the reduction of the overlapping BSS (OBSS) interference. Interference from OBSS is an issue in WLAN systems, especially for networks with large numbers of OBSS APs that are densely deployed, such as stadiums, airport, etc. Besides sectorized transmission, coordination between OBSS APs may be utilized to further improve the system efficiency and reduce interference.

Figure 18:
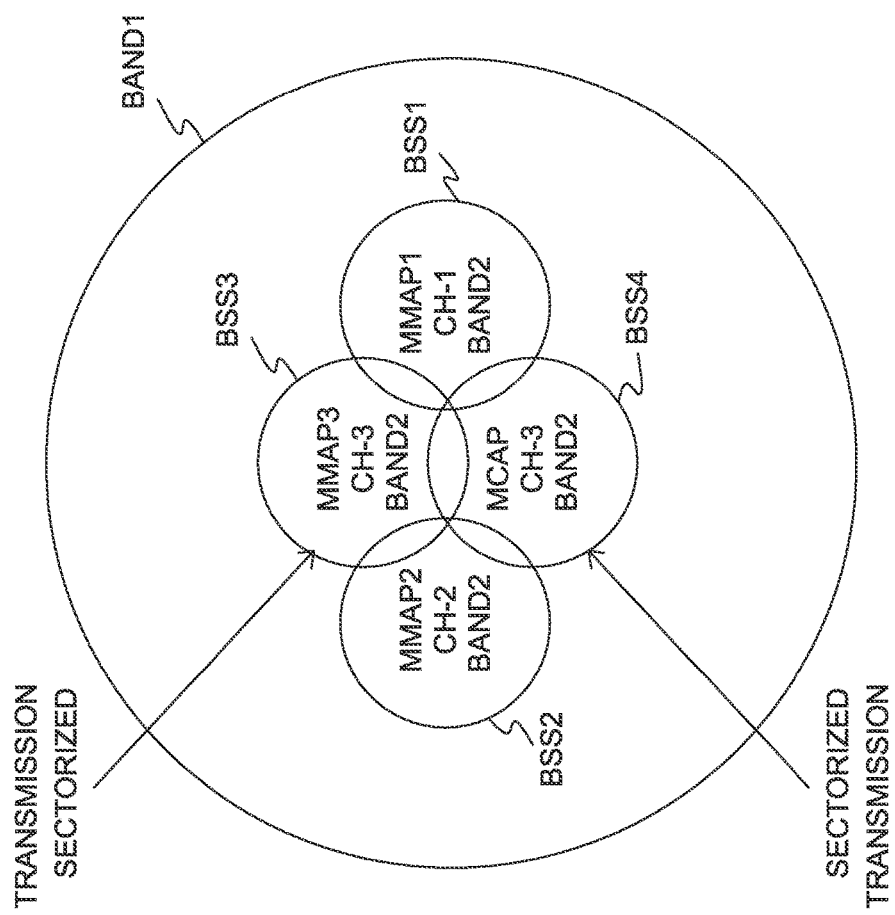
FIG. 18 shows an example of coordinated sectorized transmissions.

FIG. 18 shows an example of coordinated sectorized transmission. Coordination between APs may go through the RRM control band, and the sectorized transmissions may be on the data band. The MCAP may be located in the center of the circle, and operating on Band 1 and Band 2. Band 1 may be the RRM control band, and Band 2 may be the data band. The MCAP may form a multi-band cluster. Three MMAPs are shown which are members of the multi-band cluster and operate on different channels of Band 2. Two BSSs on Band 2 may operate on the same frequency channel, CH3 in the example. The coordinated sectorized transmission may be designed for these two BSSs.

Figure 19:
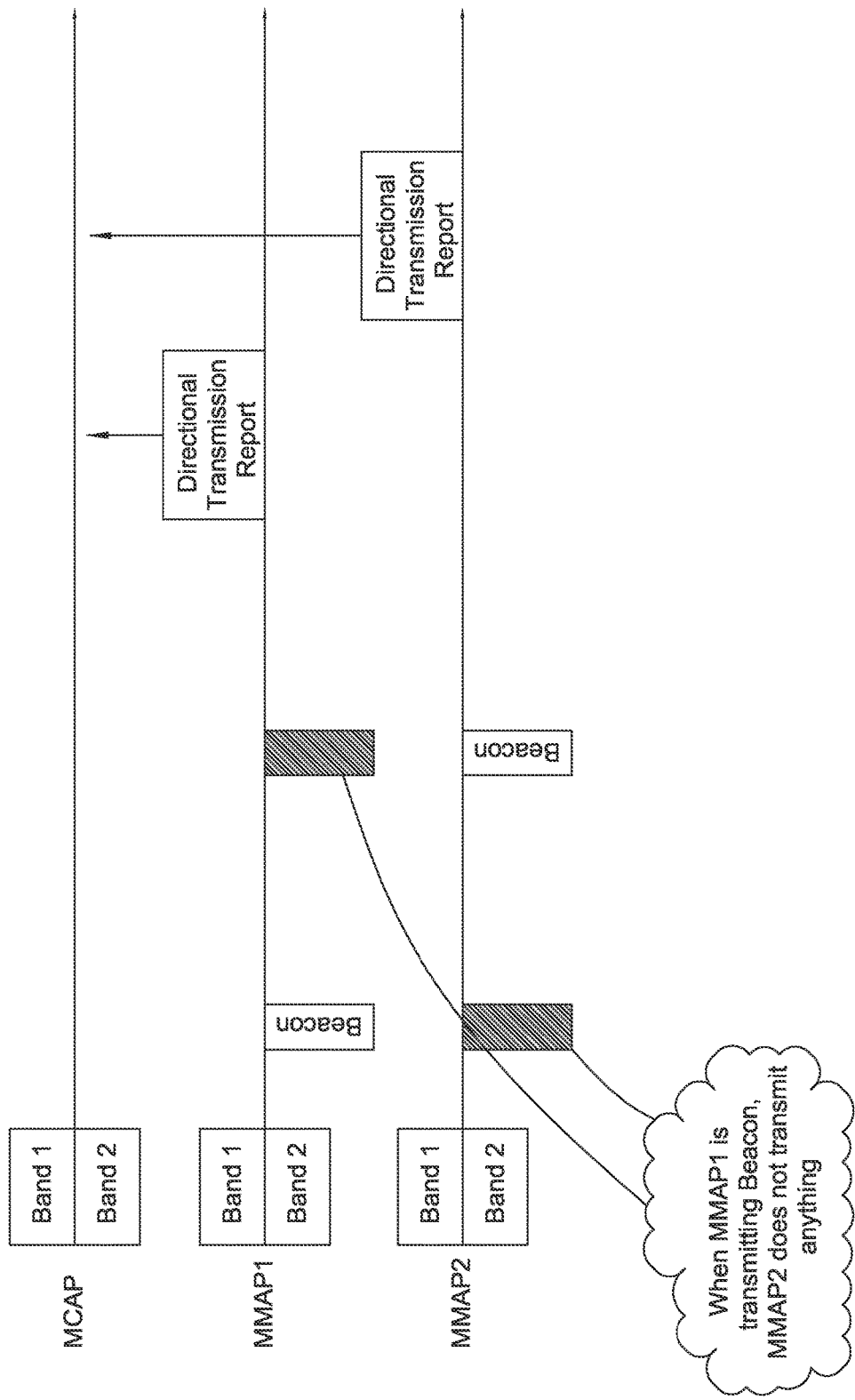
FIG. 19 shows an example procedure for multi-band aided coordinated sectorized transmission.

One example to perform coordinate sectorized transmission is to synchronize the beacon transmission for the OBSS APs over the data band. As shown in FIG. 19, MMAP1 and MMAP2 are OBSS APs on Band 2. When MMAP1 transmits a beacon, MMAP2 may not transmit or receive anything, which may give MMAP2 a chance to monitor the sectorized transmission from MMAP1. The same thing may happen when MMAP2 is transmitting. The MCAP may schedule the beacon transmissions or beacon offset for each MMAPs in such a way that the beacon frames from different MCAP are not overlapping. The MCAP may perform this by using a Multi-band Cluster Control element. The Multi-band Cluster Control element may be broadcasted from MCAP to multiple MMAPs. The MCAP may use a beacon to carry the Multi-band Cluster Control element. Alternatively, the MCAP may transmit a Multi-band Cluster Control element in a unicast way to a MMAP. FIG. 20 shows an example Multi-band Cluster Control element 2000 which may include an Element ID (2010), a length field (2020), and a Multi-band Cluster Control Information field (2030). The Multi-band Cluster Control Information field (2030) may include a beacon interval which identifies to the MMAP, by the MCAP, the beacon interval that the MMAP should utilize. The Multi-band Cluster Control Information field (2030) may include a beacon offset which identifies the offset relative to the beacon transmitted by the MCAP. The Multi-band Cluster Control Information field (2030) may include an operating channel for the data band. The Multi-band Cluster Control Information field (2030) may include an operating bandwidth for the data band and a primary channel for the data band. The Multi-band Cluster Control Information field (2030) may include a transmit power. The Multi-band Cluster Control Information field (2030) may include a sectorized transmission schedule, which if the sectional or directional transmission is supported by the MMAP, this field may be used to specify a sector used for a beacon interval. This schedule may indicate the sectional transmission in a particular beacon interval or it may be utilized to signal a periodic pattern.

Sectorized transmission or sectorized training may be included in the beacon frame, so that by monitoring the beacon frame, the nearby OBSS APs may build a Neighboring OBSS Sector Interference Table. A sector ID may be utilized to indicate the transmission of the sector. The Neighboring OBSS Sector Interference Table may utilize certain measurements to indicate the potential interference levels. FIG. 21 shows an example of a Neighboring OBSS Sector Interference Table 2100. Received Signal Strength Indication (RSSI) measurement is utilized in this example to indicate the signal strength from certain BSS and certain sectors. A special value may be used to indicate sectors that the receiver cannot detect.

With synchronized beacon transmissions, MMAPs may report to the MCAP a sectorized or directional transmission report, and the MCAP may coordinate the sectorized transmissions within the multi-band cluster according to this information. First, the MCAP may ask each MMAP to build a sectorized or directional transmission report, which may be derived from the Neighboring OBSS Sector Interference Table. The MMAPs may then send the reports to the MCAP. Alternatively, the MMAP may ask STAs in its BSS to report this table, and the MMAP may aggregate the information and send it to the MCAP. The MMAP may also abstract the information from all of the STAs and make a new report on top of it. According to the information reported from the MMAPs, the MCAP may perform a sectorized transmission scheduling algorithm to assign the sectorized transmission for all of the MMAPs in the multi-band cluster. The algorithm may be implementation dependent.

Alternatively, the multi-band aided coordinated sectorized transmission may be implemented in a distributed manner rather than a centralized manner. In one embodiment, the MCAP and MMAP devices may be identical, with each MMAP holding an MCAP token for the period that it needs to dynamically adjust its channel using a MCAP start/MCAP end frames. Alternatively, the MCAP period may be mandated for a desired period using the MCAP start frame.

Although features and elements are described above in particular combinations, one of ordinary skill in the art will appreciate that each feature or element can be used alone or in any combination with the other features and elements. Although the solutions described herein consider IEEE 802.11 specific protocols, it is understood that the solutions described herein are not restricted to this scenario and are applicable to other wireless systems as well. Although the solutions in this document have been described for uplink operation, the methods and procedures may also be applied to downlink operation. Although short interframe space (SIFS) is used to indicate various inter frame spacing in the examples of the designs and procedures, all other inter frame spacing such as reduced interframe space (RIFS) or other agreed time interval could be applied in the same solutions.

In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use by a multi-band member access point (MMAP) capable of communicating with a multi-band control access point (MCAP) using a first frequency band, and capable of communicating with associated stations (STAs) using a second frequency band, comprising:
   transmitting data in the second frequency band to the associated STAs;
   transmitting a request for information in the second frequency band to at least two associated STAs;
   receiving a report in the second frequency band from the at least two associated STAs, wherein the report includes at least interference information;
   determining a neighbor MMAP interference table, wherein the neighbor MMAP interference table is updated based on the report received in the second frequency band from the at least two associated STAs, wherein determining the neighbor MMAP interference table comprises calculating an interference value for each entry of the neighbor MMAP interference table, wherein an interference value increases on a condition that the report indicates interference and wherein an interference value decreases on a condition that no interference is indicated;
   aggregating report information received from the at least two associated STAs;
   transmitting first information in the first frequency band to the MCAP, wherein the first information is based on the aggregated report information, and wherein the first information includes an identification of an interfering MMAP, and wherein the first information includes the updated neighbor MMAP interference table; and
   receiving, from the MCAP in the first frequency band, second information regarding radio resource management of the second frequency band.

2. The method of claim 1, wherein the report includes at least one of: an interfering MMAP identification (ID), an interference level, an interference center frequency, and an interference bandwidth.

3. The method of claim 1, further comprising:
   transmitting report setup information to the at least two associated STAs in the second frequency band, wherein the report setup information includes parameters for the report.

4. The method of claim 1, wherein the second information regarding radio resource management of the second frequency band includes a command to transfer to a new channel within the second frequency band.

5. The method of claim 4, further comprising:
   transmitting a command in the second frequency band to the at least two associated STAs to transfer to the new channel in the second frequency band.

6. The method of claim 1, wherein the MMAP transmits the request for channel information to all associated STAs under the control of the MMAP and receives a report from all the STAs in the second frequency band.

7. A multi-band member access point (MMAP) capable of communicating with a multi-band control access point (MCAP) using a first frequency band, and capable of communicating with associated stations (STAs) using a second frequency band, the MMAP comprising:
   at least one transmitter configured to transmit data in the second frequency band to the associated STAs;
   the at least one transmitter configured to transmit a request for channel information in the second frequency band to at least two associated STAs;

at least one receiver configured to receive a report in the second frequency band from the at least two associated STAs, wherein the report includes at least interference information;

at least one processor configured to determine a neighbor MMAP interference table, wherein the neighbor MMAP interference table is updated based on the report received in the second frequency band from the at least two associated STAs, wherein the at least one processor is configured to calculate an interference value for each entry of the neighbor M MAP interference table, wherein an interference value increases on a condition that the report indicates interference and wherein an interference value decreases on a condition that no interference is indicated;

the at least one processor configured to aggregate report information received from the at least two associated STAs;

the at least one transmitter configured to transmit first information in the first frequency band to the MCAP, wherein the first information is based on the aggregated report information, and wherein the first information includes an identification of an interfering MMAP, and wherein the first information includes the updated neighbor MMAP interference table; and the at least one receiver configured to receive, from the MCAP in the first frequency band, second information regarding radio resource management of the second frequency band.

8. The MMAP of claim 7, wherein the report includes at least one of: an interfering MMAP identification (ID), an interference level, an interference center frequency, and an interference bandwidth.

9. The MMAP of claim 7, wherein the at least one transmitter is configured to transmit report setup information to the at least two associated STAs in the second frequency band, wherein the report setup information includes parameters for the report.

10. The MMAP of claim 7, wherein the second information regarding radio resource management of the second frequency band includes a command to transfer to a new channel within the second frequency band.

11. The MMAP of claim 10, wherein the at least one transmitter is configured to transmit a command in the second frequency band to the at least two associated STAs to transfer to the new channel in the second frequency band.

12. The MMAP of claim 7, wherein the at least one transmitter is configured to transmit the request for channel information to all STAs under the control of the MMAP and the at least one receiver is configured to receive a report from all the STAs in the second frequency band.

* * * * *